United States Patent [19]

Hashimoto et al.

[11] 4,272,171
[45] Jun. 9, 1981

[54] SINGLE-LENS REFLEX CAMERA

[75] Inventors: Akihiko Hashimoto, Hachioji; Tamotsu Koiwai, Akikawa; Isao Kondo; Toyohiko Kimura, both of Hachioji, all of Japan

[73] Assignee: Olympus Optical Co., Ltd., Tokyo, Japan

[21] Appl. No.: 85,920

[22] Filed: Oct. 18, 1979

[30] Foreign Application Priority Data

Oct. 27, 1978 [JP] Japan .................... 53-132363

[51] Int. Cl.³ ............... G03B 19/12; G03B 1/12
[52] U.S. Cl. ...................... 354/152; 354/173
[58] Field of Search .................. 354/152–156

[56] References Cited

U.S. PATENT DOCUMENTS

| 3,020,815 | 2/1962 | Landbrecht | 354/154 |
| 3,221,626 | 12/1965 | Fuketa | 354/153 |
| 3,675,557 | 7/1972 | Yokozato et al. | 354/153 |
| 3,757,661 | 9/1973 | Ochiai et al. | 354/153 |
| 3,854,811 | 12/1974 | Araki | 354/153 |
| 4,142,787 | 3/1979 | Veda et al. | 354/152 X |

Primary Examiner—Donald A. Griffin

[57] ABSTRACT

A single-lens reflex camera comprises a gear rotated when a shutter button is depressed, a movable mirror rotated upward to the prescribed position, a stop-driving mechanism, and a control mechanism which transmits the rotation moment of the gear to the movable mirror and stop-driving mechanism to lift the movable mirror so that after the movable mirror is lifted, it actuates the stop-driving mechanism in the stop-down mode.

11 Claims, 13 Drawing Figures

SINGLE-LENS REFLEX CAMERA

BACKGROUND OF THE INVENTION

This invention relates to a single-lens reflex camera comprising a stop-driving mechanism and movable mirror.

A single-lens reflex camera in general use requires two drive-mechanisms for operating a stop-driving mechanism and mirror-driving mechanism and an operation control mechanism for actuating these driving mechanisms in the prescribed timing, thus undesirably resulting in a complicated arrangement.

SUMMARY OF THE INVENTION

In recent years, a system has been developed which controls the operation of the stop or shutter by receiving reflections from the surface of a film or shutter curtain. When, with this system, the so-called programmed shutter type electric eye process (EE) is adopted in which a stop is automatically defined in accordance with an optionally selected shutter speed, it is necessary to measure an amount of light and drive a stop after a mirror is fully lifted and, after the prescribed length of time, cease the drive of the stop. This means that the stop has to be driven after the mirror is completely lifted.

It is accordingly the object of this invention to provide a single-lens reflex camera in which the rotation of a rotary member causes the stop to be driven as soon as the mirror is fully lifted, thereby prominently simplifying the drive-mechanism.

Further with the prior art single-lens reflex camera, the mirror was forcefully rotated, for example, by the urging force of a spring, and the rotation of the mirror was stopped by causing the mirror to abut against, for example, the stopper of a camera body. When, therefore, the rotation of the mirror was stopped, the resultant shock caused the mirror to bounce or give noticeable noises. Accordingly, another object of this invention is to provide a single-lens reflex camera, in which the mirror is properly located by smoothly sliding through a cam groove without striking against any surrounding part, thereby being prevented from bouncing and producing substantially no shock noises which might otherwise occur.

DETAILED DESCRIPTION OF THE PREFERRED EMBODIMENTS

Figure 1:
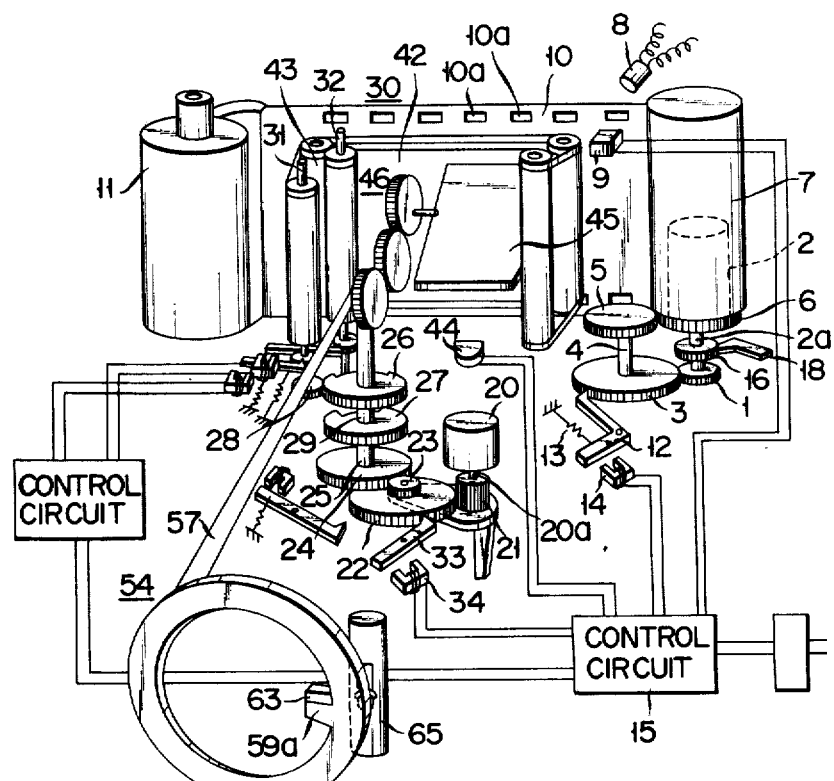
FIG. 1 is a schematic oblique view of the whole of a single-lens reflex camera embodying this invention.
Figure 2:
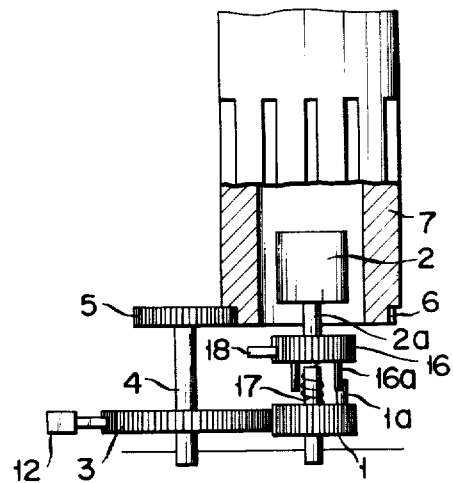
FIG. 2 is a fractional exploded front view of a film takeup mechanism of FIG. 1.
Figure 3:
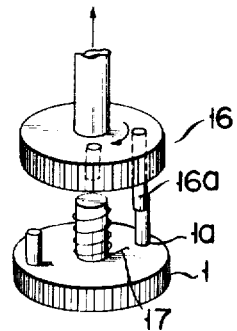
FIG. 3 is an oblique view of the main section of the film takeup mechanism.
Figure 4A:
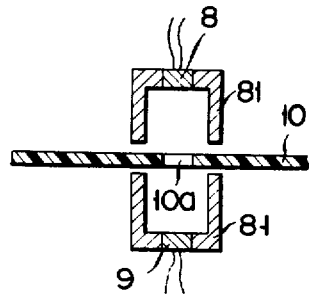
FIGS. 4A, 4B and 4C schematically indicate various forms of a counter.
Figure 4B:
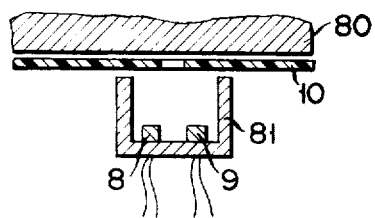
Figure 4C:
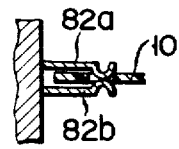

There will now be described by reference to the accompanying drawings a single-lens reflex camera embodying this invention. FIG. 1 schematically shows the arrangement of the whole of the subject single-lens reflex camera. Reference numeral 10 denotes a film wound about a patrone 11 and taken up on a spool 7. The patrone 11 and spool 7 are rotatably set in a camera body by the customary process. Independently fixed in the spool 7 is a drive motor 2 with the rotary shaft 2a extended downward. The end of the rotary shaft 2a is fitted with a concentric ratchet 16 as indicated in greater detail in FIG. 2. A gear 1 is rotatably mounted on a camera body apart from the ratchet 16 for the prescribed distance to face said ratchet 16 concentrically. The mutually facing planes of the ratchet 16 and gear 1 are respectively provided with stop pins 16a, 1a whose outer end portions lengthwise abut against each other. Each end of a coil spring 17 is connected to the ratchet 16 and gear 1 respectively. The rotation moment of the ratchet 16 by the drive motor 2 in the direction of an arrow indicated in FIG. 3 is transmitted to the gear 1 through the coil spring 17. A stop pawl 18 is engaged with the ratchet 16 to prevent it from being rotated in the opposite direction. Engaged with the gear 1 is a drive gear 3 rotatably fitted to the camera body by means of a shaft 4. This shaft 4 is fitted with another gear 5 concentric with the aforesaid drive gear 3. The gear 5 is engaged with a gear 6 provided on the periphery of the lower end of the spool 7. Thus, the rotation of the gear 1 is transmitted to the spool 7 through the gears 3, 5, 6 in turn to rotate the spool 7, which consequently takes up the film 10. A rotation stop pawl 12 is provided to be engaged with the drive gear 3 to stop its rotation. The rotation stop pawl 12 is normally urged by a tension spring 13 for engagement with the drive gear 3. Only when an electromagnet 14 (FIG. 1) set close to the rotation stop pawl 12 is excited, the stop pawl 12 has one end attracted to the electromagnet 14 to be disengaged from the drive gear 3. In the passage of the film 10, a light-emitting element 8 and light-receiving element 9 are respectively provided on each side of a linear arrangement of the perforations 10a of the film 10. The light-emitting element 8 and light-receiving element 9 jointly constitute a counter for counting a number of film perforations 10a passing therethrough. The light-emitting element 8 is connected to a power supply circuit. When the film perforations 10a pass the light-emitting element 8 while it is emitting light rays, then light rays conducted through the film perforations 10a are caught by the light-receiving element 9. An electric signal is produced for each light ray received. The electric signal is supplied to a control circuit 15 to control the actuation of the electromagnet 14. When the prescribed number of (for example, eight) film perforations 10a pass the light-receiving element 9, then the control circuit 15 deenergizes the electromagnet 14 to stop the rotation of the drive gear 3. When the ninth perforation 10a passes the light-receiving element 9, then the control circuit 15 cuts off power supply to the light-emitting element 8 and light-receiving element 9. When a release button (not shown) is depressed, then the control circuit 15 supplies power to the light-emitting element 8 and light-receiving element 9, and also drives the motor 2. The aforesaid counter is formed of the light-emitting element 8 and light-receiving element 9 disposed on both sides of a film 10 (FIG. 4A). However, any other device can well serve the purpose, provided it can detect a number of passing film perforations 10a. For instance as shown in FIG. 4B, it is possible to arrange both light-emitting element 8 and light-receiving element 9 on one lateral side of the film 10 and provide a reflector 80 on the other lateral side of the film 10, thereby counting a number of film perforations 10a from light rays passing through said perforations 10a and reflected from the reflector 80. When light is applied in counting film perforations 10a, it is necessary to let the light-receiving element 9 catch as much light as possible. Therefore, it is practically preferred to cover both light-emitting element 8 and light-receiving element 9 with a light shield in order to prevent the escape of light rays. Further, the film perforation counter may be formed of mechanical means as illustrated in FIG. 4C. With the modification of FIG. 4C, both sides of a film 10 are lightly touched by a pair of electric contacts 82a, 82b. These contacts 82a, 82b are electrically connected together, each time the respective film perforations 10a arrive, thereby closing a power circuit. When, with a film takeup device constructed as described above, a release button is pressed to release a shutter, then the motor 2 is driven by means of the control circuit 15. The driving force of the motor 2 is transmitted to the spool 7 through a series of gears 1, 3, 5, 6. The film 10 is taken up on the spool 7 by the rotation of these gears. When the counter counts the prescribed number of film perforations 10a, that is, one film frame is taken up, then a signal issued from the counter is conducted through the control circuit 15 to deenergize the electromagnet 14. As a result, the rotation stop pawl 12 is driven by the urging force of the spring 13 for engagement with the drive gear 3 to stop its rotation. The control circuit 15 not only deenergizes the electromagnet 14 but also stops the rotation of the motor 2, thus completing the operation of taking up the film 10. Even where the rotation of the drive gear 3 is stopped by the rotation stop pawl 12 and consequently the motor 2 ceases to run, the rotary shaft 2a of the motor 2 continues rotation due to inertia. However, the rotation moment of the rotary shaft 2a is absorbed by the coil spring 17, and is little likely to impart an excessively great force to the gears 1, 3. Eventually, the rotary shaft 2a stops rotation due to the stop pins 1a, 16a being pressed against said rotary shaft 2a. The rotation moment of the rotary shaft 2a of the motor 2 absorbed by the spring 17 acts as a starting force to initiate the rotation of the gear 1 at the succeeding film takeup operation, thereby enabling said takeup to be finished in a short time.

There will now be described the arrangement and operation of a drive-mechanism of a movable mirror 45 which can be rotated through a camera body between a starting position of 45° and a terminal position of 90° as measured from the surface of the film 10, a drive-mechanism of a focal plane shutter and a stop mechanism.

Figure 5:
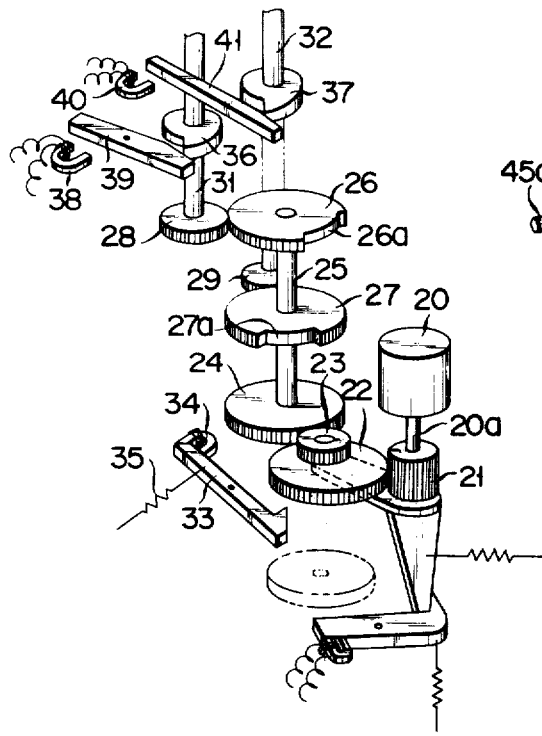
FIG. 5 is an oblique view of a shutter-driving mechanism.
Figure 6:
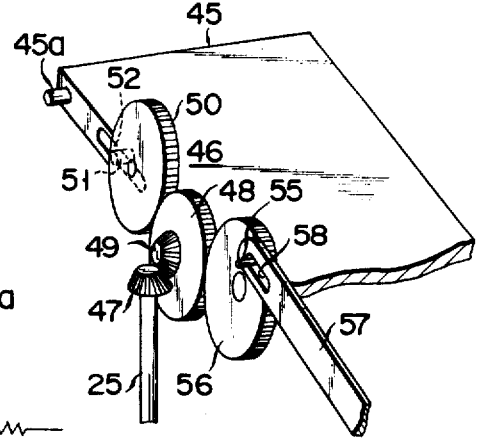
FIG. 6 is an oblique view of a movable mirror-driving mechanism.

Referring to FIG. 1, reference numeral 20 denotes a second drive motor fixed in the camera body. The rotary shaft 20a of the second motor 20 is fitted with a pinion 21 shown in greater detail in FIG. 5. The pinion 21 is engaged with a drive gear 22. A pinion 23 concentrically mounted on said drive gear 22 is engaged with another drive gear 24. This last mentioned drive gear 24 is fixed to a shaft 25 rotatably fitted to the camera body. First and second notched gears 26, 27 are concentrically fitted to the rotary shaft 25. The peripheries of the notched gears 26, 27 respectively have notched portions 26a, 27a. The notched gears 26, 27 are so positioned that the notches 26a, 27a are displaced from each other. A first pinion 28 is engaged with the first notched gear 26. A second pinion 29 is engaged with the second notched gear 27. The first pinion 28 is fixed to the lower end of the front curtain shaft 31 of a focal plane shutter 30. The second pinion 29 is fixed to the lower end of the rear curtain shaft 32 of the focal plane shutter 30. When a release button is pressed, the focal plane shutter 30 is actuated by the motor 20 through the above-mentioned gear transmission system. The gear transmission system is provided with a control mechanism for defining a shutter speed while being driven by the aforesaid control circuit 15. A rotation stop pawl 33 is provided by the side of the drive gear 22 to stop its rotation when engaged therewith. The rotation stop pawl 33 is rotated for engagement with the drive gear 22 to stop its rotation when an electromagnet 34 set near the base end of the pawl 33 is deenergized and the pawl 33 is urged by a spring 35. A first cams 36 is fixed to the front curtain shaft 31 of the focal plane shutter 30 concentrically with the first pinion 28. A second cam 37 is fixed to the rear curtain shaft 32 of the focal plane shutter 30 concentrically with the second pinion 29. A control lever 39 is provided for the first cam 36. When selectively actuated by an electromagnet 38, the control lever 39 is engaged with the first cam 36, thereby controlling the rotation of the front curtain shaft 31 of the focal plane shutter 30. Similarly, a control lever 41 is provided for the second cam 37. When selectively driven by an electromagnet 40, the control lever 41 is engaged with the second cam 37, thereby controlling the rotation of the rear curtain shaft 32 of the focal plane shutter 30. The operation of the three electromagnets 34, 38, 40 is controlled by the control circuit 15. Referring to FIG. 1, reference numeral 42 denotes the front curtain of the focal plane shutter 30, and reference numeral 43 shows the rear curtain thereof. Reference numeral 44 represents a light-receiving element which receives reflections from the film surface and sends forth an electric signal corresponding to a received amount of light to the control circuit 15.

Figure 7:
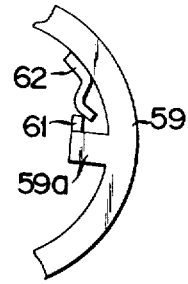
FIG. 7 is a fractional exploded front view of a different form of a stop ring.

A bevel gear 47 is mounted on the upper end of the rotary shaft 25 rotated by the motor 20. This bevel gear 47 operates a drive mechanism 46 for effecting the rotation of a movable mirror 45. Engaged with the bevel gear 47 is a bevel gear 49 concentrically fixed to one side of a flat gear 48. The flat gear 48 is engaged with a mirror-driving gear 50. An eccentric pin 51 is erected on one side of the mirror-driving gear 50 in a state displaced from the center thereof. The eccentric pin 51 is loosely inserted into an elongated hole 52 formed on one side of the movable mirror 45. When the mirror-driving gear 50 is rotated by the motor 20, then the pin 51 causes the mirror 45 to be rotated about the support shaft 45a with the aid of the elongated hole 52. The flat gear 48 also drives a stop mechanism 54 (FIG. 1), as described below, while the operation of the focal plane shutter 30 and that of the rotation of the mirror 45 are controlled. Namely, the flat gear 48 is engaged with a gear 56, on one side of which an eccentric engagement pin 55 is erected in a state displaced from the center of said gear 56. The eccentric engagement pin 55 is loosely inserted into an elongated hole 58 formed at one end of a stop board 57, the other end of which is connected, as shown in FIG. 1, to a stop ring 59. This stop ring 59 is rotated with the gear 56 to the prescribed extent by means of the eccentric engagement pin 55, elongated hole 58 and stop board 57. A stop board 61 fitted to one end face of a lens barrel 60 is rotated to operate a stop mechanism received in said lens barrel 60. The rotation of the stop board 61 is effected by engagement between said stop board 61 and a protuberance 59a inward extending from the inner wall of the stop ring 59. The inward extending protuberance 59a is provided with a permanent magnet 63. The stop board 61 is also provided with a permanent magnet 64. The stop board 61 is rotated with the stop ring 59 by attraction between both permanent magnets 63, 64. It is possible to mount the permanent magnet 63 or 64 on either the protuberance 59a or the stop board 61 and prepare the other member from magnetic material. Further, it is possible to provide a plate spring 62 (FIG. 7) near the protuberance 59a and hold the stop board 61 securely in place by the urging force of said spring 62. Referring to FIG. 1, reference numeral 65 denotes a damper for stabilizing the rotation of the stop ring 59.

There will now be described the operation of the various mechanisms constructed as described above. First, a release button is pressed to rotate the drive motor 20 through the control circuit 15, thereby causing the first and second notched gears 26, 27 and bevel gear 47 to be rotated at the same speed. As a result, the first notched gear 26 takes up the front curtain 42 by means of the first pinion 28. The second notched gear 27 takes up the rear curtain 43 by means of the second pinion 29. The bevel gear 47 lifts or rotates the movable mirror 45 by means of the gears 48, 50 to the position of 90°. At this time, the gear 56 is also rotated. Since, however, the stop board 57 is moved in a direction opposite to that in which a stop-down is carried out, the stop mechanism is not put into operation. When the motor 20 is rotated, then the second pinion 29 is made to face the notch 27a of the second notched gear 27, thereby stopping the transmission of the rotation of the notched gear 27. At this time, the control lever 41 is engaged with the cam 37 to sustain the above-mentioned condition in which the rotation of the notched gear 27 is stopped. In other words, the run of the rear curtain 43 is ceased. Later when the first pinion 28 is disengaged from the notch 26a of the first notched gear 26, then the front curtain 42 is set in the prescribed position by the action of the control lever 39. At this point of time, the mirror 45 still continues to be lifted, and soon takes a position allowing for the photographing of a foreground subject. At this time, the stop board 57 begins to be brought down by the rotation of the gear 56. The stop mechanism of the lens barrel 60 commences stop-down. This stop-down is effected by magnetic attraction between the permanent magnet 64 of the stop board 61 fitted to the lens barrel 60 and the permanent magnet 63 of the stop ring 59. Consequently, the stop board 61 is smoothly rotated with the stop ring 59, thereby suppressing the occurrence of any unnecessary vibration in the stop mechanism. The condition in which the stop-down operation is going on is detected by the light-receiving element 44. When a signal sent forth from the light-receiving element 44 has the prescribed voltage level of, for example, +1 eV, then power supply to the motor 20 is cut off by means of the control circuit 15. When an output signal from the light-receiving element 44 has the succeeding prescribed voltage level, then the electromagnet 34 is deenergized. As a result, the engagement pawl 33 is rotated by the urging force of the spring 35 to stop the rotation of the gear 22. The above-mentioned operation sets the movable mirror 45 in a position allowing for photographing and adjusts a stop to a proper value. Later, the electromagnets 38, 40 are deenergized by means of the control circuit 15 at the prescribed interval, and the corresponding control levers 39, 41 are driven to allow for the rotation of the cam 36 and the run of the rear curtain 43 of the focal plane shutter 30. Upon completion of the exposure of a film, the drive motor 20 is again rotated by means of the control circuit 15, and the electromagnet 34 is excited to disengage the engagement pawl 33 from the gear 22. As a result, the rotation moment of the motor 20 is transmitted to the stop board 57 through a series of the gears. At this time, the stop mechanisms is first stopped down to the smallest aperture and then left open. The movable mirror 45 begins to fall by means of the drive mechanism 46. When the fall of the mirror 45 is brought to an end, the electromagnet 34 is deenergized, causing the rotation of the gear 22 to be stopped by the engagement of the pawl 33 therewith. In this case, it is preferred to cease the drive of the motor 20 a little before the stop of the rotation of the gear 22. The dimensions of the notch 26a of the first notched gear 26 and those of the notch 27a of the second notched gear 27 are so defined that during the fall of the mirror 45, engagement between the second notched gear 27 and second pinion 29 precedes engagement between the first notched gear 26 and first pinion 28. During the fall of the mirror 45, therefore, the rear curtain 43 is first taken up, and then the front curtain 42 is taken up. Even when the mirror 45 is fully brought down, the front curtain 42 and rear curtain 43 are still in the process of being taken up. When, therefore, one frame of a film 10 is fully taken up and the mirror 45 is kept in a fallen state, then a spring for driving the focal plane shutter is not fully supplied with an urging force but remains in an interior state. When a release button is pressed under this condition, then photographing takes place in the above-mentioned manner.

There will now be described by reference to FIGS. 8 and 9 a modification of the mirror-driving mechanism. A takeup board 70 is provided with a gear 71 which concentrically faces said takeup board 70 at the prescribed interval. A coil spring 72 is stretched between the takeup board 70 and gear 71. When the takeup board 70 is rotated in a direction the same as that in which the coil spring 72 is wound, then the coil spring 72 is supplied with an urging force to let the gear 71 rotate clockwise. Control pins 70a, 71a are erected on the mutually facing inner walls of the takeup board 70 and gear 71 and abut against each other when respectively making one full rotation, thereby stopping the rotation of said takeup board 70 and gear 71. The outer wall of the gear 71 is fitted with a cam 74 for actuating a switch 73 for switching power supply to a light-measuring circuit system in accordance with the rotation of the gear 71. As in the foregoing embodiment, the gear 71 is engaged with the gear 50 provided with the eccentric pin 51 to effect the rotation of the movable mirror 45 and the gear 56 on which the pin 55 is erected to actuate the stop mechanism by means of the stop board 57. With the embodiment of FIGS. 8 and 9, the engagement pawl 33 is engaged with a gear 75 concentrically fitted to the gear 56. A stop pin 71b is projectively mounted on the gear 71. This stop pin 71b is engaged with one end of an engagement pawl 77 urged by a spring 76, thereby stopping with clockwise rotation of the gear 71. When a release button is pressed, the engagement pawl 77 is rotated clockwise against the urging force of the spring 76 to be disengaged from the stop pin 71b.

Figure 8:
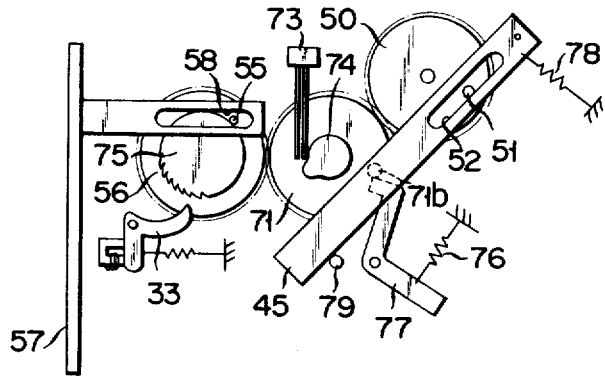
FIG. 8 is a side view of the movable mirror-driving mechanism.
Figure 9:
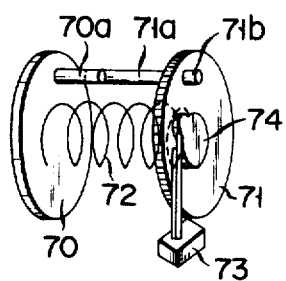
FIG. 9 is an oblique view of the main part of said mirror-driving mechanism.

Now let it be assumed that with the embodiment of FIGS. 8 and 9 constructed as described above, the rotation of the takeup board 70 supplies the coil spring 72 with an urging force to rotate the gear 71, and the movable mirror 45 is kept in a fallen state as seen from FIG. 8. Since, under this condition, the pin 51 is loosely inserted into the elongated hole 52 of the mirror 45, a mirror spring 78 urges the mirror 45 to rotate counterclockwise. A stop pin 79 keeps the mirror 45 in said counterclockwise rotated position. The pin 55 of the gear 56 holds the stop board 57 in an initial position in which the stop mechanism is not put into operation. The switch 73 is so engaged with the cam 74 as to be left open. When a release button is pressed under the above-described condition, then the engagement pawl 77 is rotated clockwise of FIG. 8 by the urging force of the spring 76, causing the mirror 45 to be rotated upward by means of the gear 50 and pin 51. Though, at this time, the pin 55 is rotated by means of the gear 56, the stop board 57 is moved in the opposite direction, thereby preventing the stop mechanism from being put into operation. The switch 73 is closed by the rotation of the cam 74 to render a light-measuring circuit operative. Further let it be assumed that a stop aperture is defined by measuring an amount of directly supplied light rays, and the engagement pawl 33 is engaged with the gear 75 due to the deenergization of an electromagnet to stop the rotation of said gear 75. Then the rotation of the stop gear 56 is ceased to terminate the movement of the stop board 57. Consequently, the stop mechanism is chosen to have the prescribed aperture. When disengaged from the pawl 33 after completion of photographing, the gear 75 is rotated close to the initial position. This rotation causes the movable mirror 45 to fall to the original position of 45° and the stop board 57 to be released.

Figure 10:
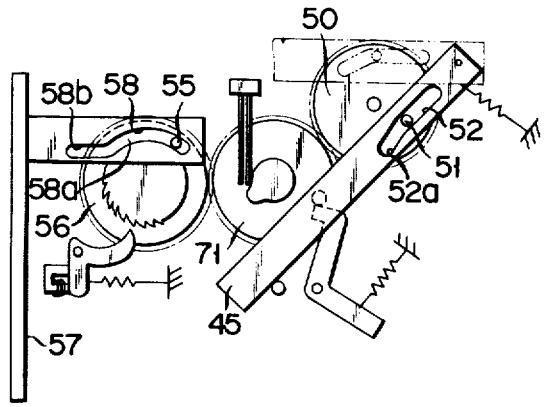
FIGS. 10 and 11 are respectively the side views of the modifications of the stop-driving mechanism and movable mirror-driving mechanism.

FIG. 10 shows a modification of the stop-driving mechanism and mirror-driving mechanism. An elongated hole 58 which is formed in the stop board 57 and through which the pin 55 slides comprises a segmental section 58a formed on the periphery of an imaginary circle concentric with the gear 56 and a linear section 58b contiguous to said segmental section 58a. A play section 52a is provided near the furthest end of the elongated hole 52 through which the pin 51 slides. When the gear 71 is rotated by the drive of the motor and two gears 50, 56 engaged with said gear 71 are rotated, then the pin 51 of the gear 50 causes the movable mirror 45 to be rotated or lifted to a position indicated in broken lines by means of the elongated hole 52. The pin 55 of the other gear 56 slides along the segmental section 58a of the elongated hole 58, until the mirror 45 is lifted to the position of 90°. As a result, the stop board 57 is kept in the initial position, preventing the stop mechanism from being put into operation. When the gear 71 is rotated, the pin 51 is brought into the play section 52a of the elongated hole 52, thus preventing the movable mirror 45 from being further rotated. At this time, the pin 55 is guided into the linear section 58b of the elongated hole 58 to drive the stop board 57 and carry out stop-down. With the modification of FIG. 10, neither of the elongated holes 52, 58 puts the stop board 57 into operation while the movable mirror 45 is being lifted. After the movable mirror 45 is most lifted, both elongated holes 52, 58 actuate the stop board 57 to carry out stop-down. With the modification of FIG. 10, both mirror-driving gear 50 and stop gear 56 are provided separately from the common gear 71. However, it is not always necessary to provide these gears 50, 56.

Figure 11:
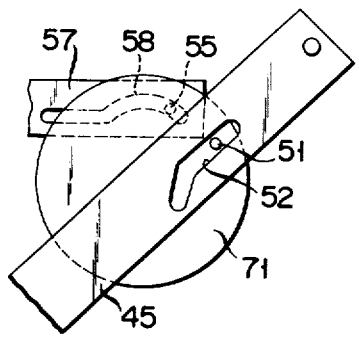

There will now be described by reference to FIG. 11 another modification in which the above-mentioned gears 50, 56 are omitted. With the modification of FIG. 11, both surfaces of the gear 71 driven by the motor are fitted with pins 51, 55 extending in the opposite directions. One pin 51 is slidably inserted into an elongated hole 52 formed in the movable mirror 45. The other pin 55 is slidably inserted into an elongated hole 58 formed in the stop board 57. As in the modification of FIG. 10, the elongated holes 52, 58 cause the stop board 57 to be driven by the pin 55, after the rotation of the movable mirror 45 by the pin 51 is brought to an end.

With the embodiment of FIG. 1, the rotation of the gear 22 by the drive of the motor 20 is brought to an end, when the lever 33 is engaged with said gear 22. However, it is possible to omit the lever 33 and stop the rotation of the gear 27 by ceasing the run of the motor 20 itself.

What we claim is:

1. A single-lens reflex camera comprising:
   a rotary means rotated when the operation of a focal plane shutter is commenced;
   a movable mirror rotated upward to the prescribed position;
   a stop-driving mechanism; and
   a control mechanism which transmits the rotation moment of the rotary means to the movable mirror and stop-driving mechanism to lift the movable mirror and, after the movable mirror is lifted, to actuate the strop-driving mechanism in the stop-down mode,
   said control mechanism comprising
   first and second cams,
   a first pin cooperable with the first cam, and
   a second pin cooperable with the second cam;
   the first cam being mounted on one of the rotary means and the movable mirror, and the first pin being mounted on the other one,
   the second cam being mounted on one of the rotary means and the stop-driving mechanism, and the second pin being mounted on the other one, and
   the first and second cams being so shaped that the stop-driving mechanism is actuated in the stop-down mode after the movable mirror is lifted.

2. The single-lens reflex camera according to claim 1, wherein the rotary means is driven by a motor rotated when a release button is pressed.

3. The single-lens reflex camera according to claim 2, wherein the motor is set at the bottom of a camera body; the rotary means is mounted on the lateral wall of the camera body; and both are coupled together by means of a bevel gear.

4. The single-lens reflex camera according to claim 2, wherein a mechanism for accumulating a shutter driving force is provided between the motor and rotary means.

5. The single-lens reflex camera according to claim 2, wherein said motor is one for winding a focal plane shutter.

6. The single-lens reflex camera according to claim 1, wherein the rotary means is driven by a spring whose urgining force is accumulated when a film is taken up.

7. The single-lens reflex camera according to claim 1, wherein the stop-driving mechanism has its operation ceased upon receipt of an output from a light-measuring element which receives reflections from the surface of the curtains of a focal plane shutter and measures a received amount of light rays when the mirror is fully rotated.

8. The single-lens reflex camera according to claim 1, wherein the first and second pins are mounted on the rotary means in a state displaced from the center of said rotary means to be rotated therewith; and said first cam comprises a mirror-driving cam groove formed in the movable mirror, and, when the first pin slides through the cam groove, it allows the movable mirror to be rotated; and said second cam comprises a stop-driving cam groove which is formed in the stop-driving mechanism, and, when the second pin slides through the cam groove, it allows the stop-driving mechanism to be operated.

9. The single-lens reflex camera according to claim 1, wherein said rotary means comprises first and second rotary members, said first and second pins are respectively mounted on the first and second rotary members in an eccentric state, said first cam comprises a mirror-driving cam groove formed in the movable mirror into which the first pin is inserted, and when the first pin slides through said cam groove, it drives the movable mirror, and said second cam comprises a stop-driving cam groove formed in the stop-driving mechanism into which the second pin is inserted, and when the second pin slides through said cam groove, it actuates the stop-driving mechanism.

10. The single-lens reflex camera according to claim 9, wherein the mirror-driving cam groove and stop-driving cam groove are made substantially linear; and, while the mirror is being lifted, a stop-driving member of the mechanism is driven in a direction opposite to that in which the stop-down is carried out, and, after the mirror is fully lifted, in the stop-down direction.

11. The single-lens reflex camera according to claim 9, wherein the mirror-driving cam groove and stop-driving cam groove are each formed of a substantially linear section and a seqmental section contiguous to said linear section; while the mirror is being lifted, the first pin is disposed in the linear section of the mirror-driving cam groove, and the second pin is positioned in the segmental section of the stop-driving cam groove; and when the mirror is fully lifted, the first pin is brought into the segmental section of the mirror-driving cam groove, and the second pin enters the linear section of the stop-driving cam groove.

* * * * *